Sept. 15, 1931.  A. S. JOHNSON ET AL  1,823,742
COMBINED CLUTCH AND BRAKE PEDAL FOR MOTOR VEHICLES
Filed Jan. 27, 1930
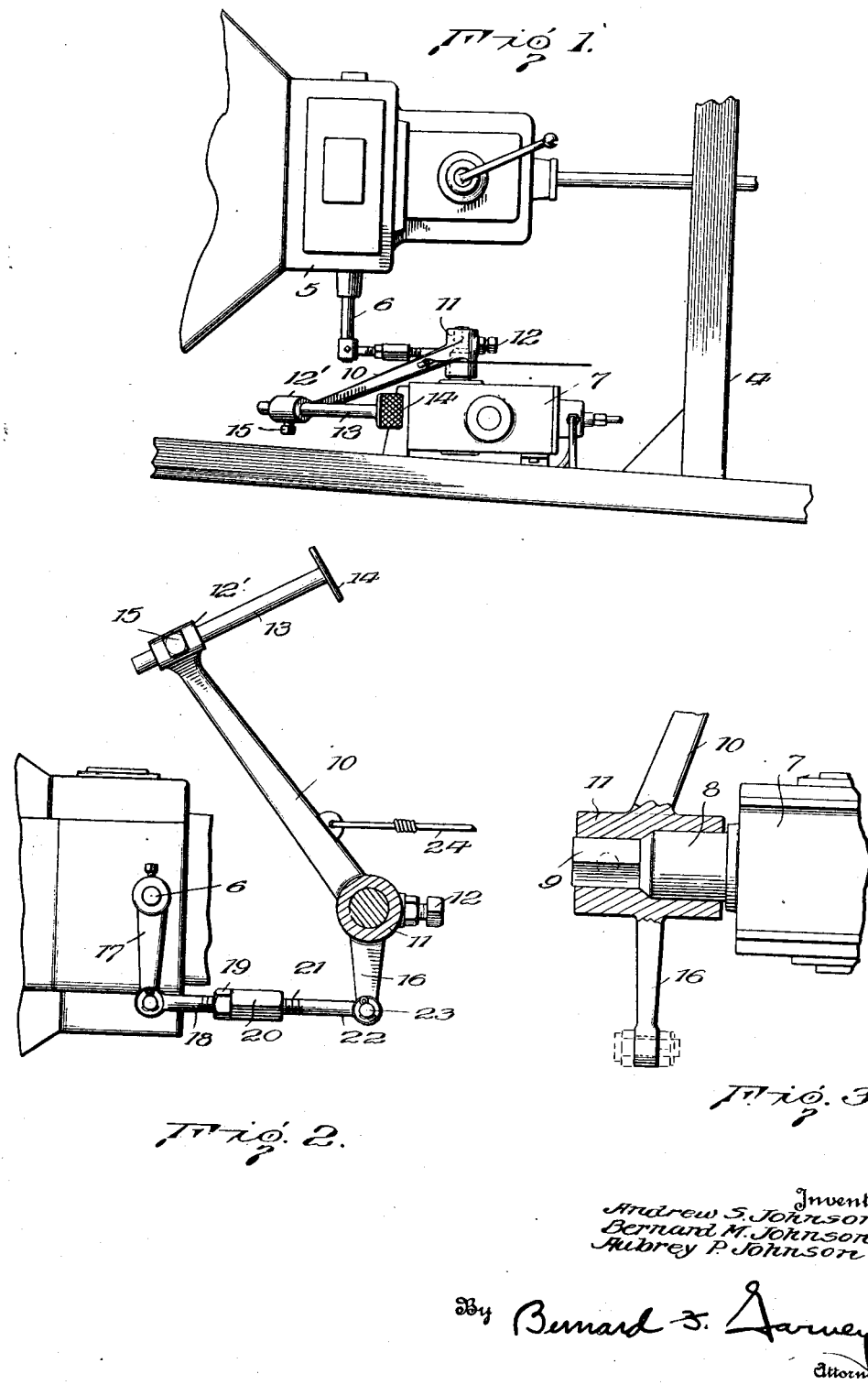
Inventors
Andrew S. Johnson
Bernard M. Johnson
Aubrey P. Johnson Patented Sept. 15, 1931

1,823,742

UNITED STATES PATENT OFFICE

ANDREW S. JOHNSON, BERNARD M. JOHNSON, AND AUBREY P. JOHNSON, OF BEDFORD, VIRGINIA

COMBINED CLUTCH AND BRAKE PEDAL FOR MOTOR VEHICLES

Application filed January 27, 1930. Serial No. 423,724.

The present invention consists of a combined clutch and brake pedal for motor vehicles.

It is of course, well known in the art to provide combination clutch and brake pedals, but their effectiveness has been negatived for the most part because of the complexity of the mechanism employed and/or because of the uncertainty of operation, which makes it necessary to still employ a separate brake pedal. It is therefore the principal object of the present invention to provide a single pedal for use in operating standard clutch and brake mechanisms in such a positive manner that use of an additional pedal is unnecessary.

A further object of the invention is to provide a brake pedal which is directly connected to the master cylinder shaft of a hydraulic braking system and which is adjustably, though positively connected to the clutch mechanism of a motor vehicle to provide a durable, positive and quick acting device for applying the brakes and disengaging the clutch.

Other objects of the invention will be apparent from the following description of the present preferred form of the device, taken in connection with the accompanying drawings, wherein Fig. 1 is a plan view of a combined clutch and brake operating pedal constructed in accordance with the present invention, illustrating its application on clutch and brake operating shafts on a motor vehicle, portions of the latter being shown fragmentarily;

Fig. 2 is a side elevational view of a pedal constructed in accordance with the present invention illustrating the application of the same, to a clutch operating shaft and a master cylinder control shaft, the latter being shown fragmentarily; and Fig. 3 is a detail fragmentary sectional view of a pedal constructed in accordance with the present invention, illustrating the application of the same to a master brake cylinder control shaft.

In the drawings, in order to illustrate the application of this invention, a portion of a motor vehicle chassis is shown fragmentarily, as indicated at 4. The chassis is equipped with a clutch housing 5, of standard design, from which a clutch control shaft 6 projects. The chassis is also equipped with a master brake cylinder 7 which is of conventional design as employed in hydraulic brake systems for motor vehicles. A brake control shaft 8 extends from the master cylinder 7, the outer terminal of which is a squared cross-sectional configuration, as indicated at 9, for a purpose hereinafter set forth.

The clutch and brake operating pedal constructed in accordance with the present invention is indicated at 10, the main body portion of which is provided with an intermediate collar or sleeve 11, which is provided with a bore complementing the contour of the shaft 8 and is sleeved over the latter. The collar or sleeve 11 is held from displacement on the shaft because of the squared configuration 9 of the outer end of the shaft, in conjunction with a set screw 12, which is detachably mounted in the sleeve and is adapted to impinge against the squared end 9 of the shaft. One end of the brake pedal 10 is formed to provide a cylinder 12', the bore of which slidably receives the shank 13 of the pedal per se 14. The shank is adapted to be held in a predetermined adjusted position by a set screw 15 which is mounted in the cylinder and is adapted to extend through the bore of the latter to engage the shank 13. The opposite end of the brake pedal 10 is disposed at an angle to that portion which terminates in the cylinder 12 and consists of an arm 16, the free terminal of which is apertured.

The clutch control shaft 6 is adapted for detachable engagement with one end of a link 17, the opposite end of the latter being detachably engaged with one end of a rod 18, the shank of which is screw threaded and adapted for engagement with a jam nut 19 and a turnbuckle or nut 20. The turnbuckle or nut 20 is also engaged with the threaded shank 21 of a rod 22, the latter being bifurcated and having the branches of the furcation slidably engaged with the free end of the arm 16 and apertured to align with the aperture of the arm for the reception of a pin 23. The pin 23 is adapted to engage through the openings in the apertures of the shaft 22 and the opening in the arm 16 and is held from displacement by a cotter pin or like means.

To return the pedal 10 to a position of rest, a yielding cable or the like 24, may be provided, one end of which is anchored on the body of the pedal 10 while the opposite end may be anchored on the chassis 4 or some other permanent part of the motor vehicle.

In use of this device it is apparent that pressure upon the pedal 14 will rotate the shafts 6 and 8 in a manifest manner. The rotation of these shafts is designed to be simultaneous so that the braking operation will be contemporaneous with the disengagement of the clutch. It is well known in the operation of motor vehicles that as a rule the vehicle is traveling at a rate of speed in excess of the engine speed. Hence where the clutch is first released, added momentum is usually given to the vehicle. Even though this may be only momentary, it is undesirable, since in many instances, especially in an emergency, a quick stop is necessary. The construction of the present invention permits the simultaneous operation of the brakes and disengagement of the clutch to effect more expeditious stopping of the vehicle. It is obvious that the throw of the pedal for accelerating or decelerating the operation of the clutch may be adjusted by the turnbuckle or nut 20. Furthermore, the pedal per se may be adjusted by releasing the set screw 15.

It is of the essence of importance in the present invention that the shaft 8 of the master brake cylinder and the outer terminal thereof be squared to interfit the squared portion of the bore in the sleeve 11 to prevent rotary movement of the sleeve on the shaft and to provide a flat surface against which the set screw 12 may be engaged to prevent casual displacement of the sleeve. It is also important in the present invention that the body portion of the pedal 10, sleeve 11 and arm 16 be cast or otherwise formed as a unit to provide a simple, compact structure, eliminating multiplication of parts and occupying only a minimum amount of space in the vehicle.

It is to be understood that although the above is the preferred form of the invention, various changes may be made in the construction and operation thereof, within the scope of the following claims.

What is claimed is:—

1. In combination with a clutch and hydraulic brake operating mechanism, embodying a master cylinder with a projecting brake controlling shaft, the outer terminal of which is square in cross-section; a brake and clutch operating lever, an intermediate part of which is formed to provide a sleeve, the bore of which complements the master cylinder shaft to permit engagement of the sleeve with the latter, means extending through said sleeve for impingement with the squared end of the shaft, and means for engaging one end of the lever with the clutch.

2. In combination with a clutch and hydraulic brake operating mechanism embodying a master cylinder with a projecting brake controlling shaft, a unitary lever structure sleeved on said shaft and detachably engaged therewith, and means detachably and adjustably engaging the lever with the clutch.

ANDREW S. JOHNSON.
BERNARD M. JOHNSON.
AUBREY P. JOHNSON.